Aug. 9, 1960     M. W. McCOLLUM     2,948,311
TREE HARVESTING APPARATUS
Filed Oct. 20, 1958     3 Sheets-Sheet 1
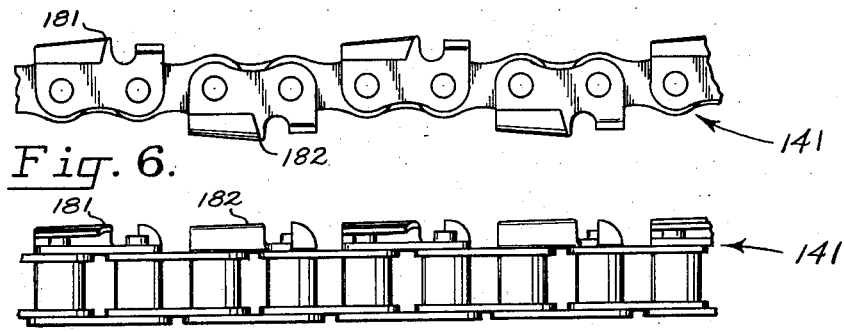
Fig. 6.
Fig. 5.
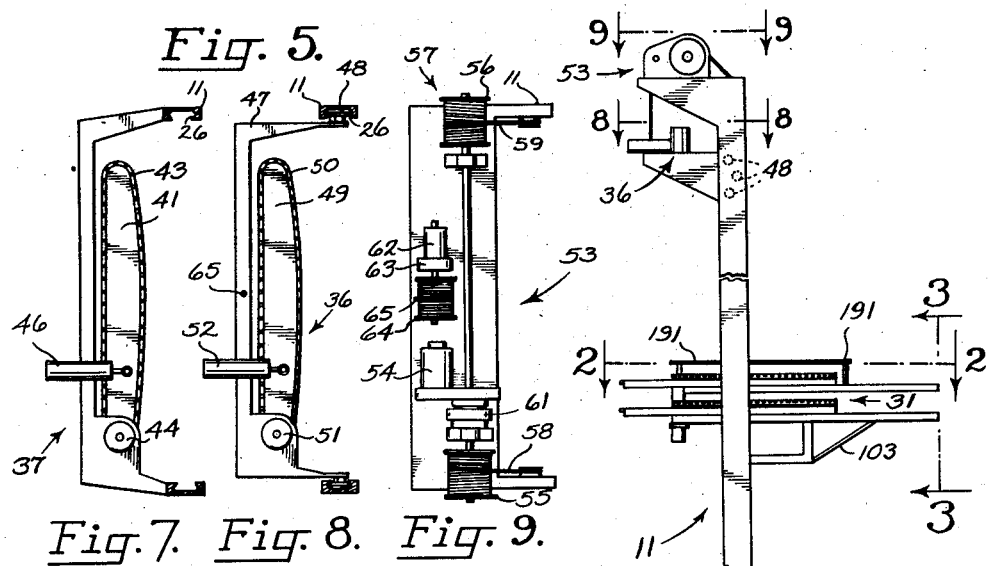
Fig. 7.    Fig. 8.    Fig. 9.
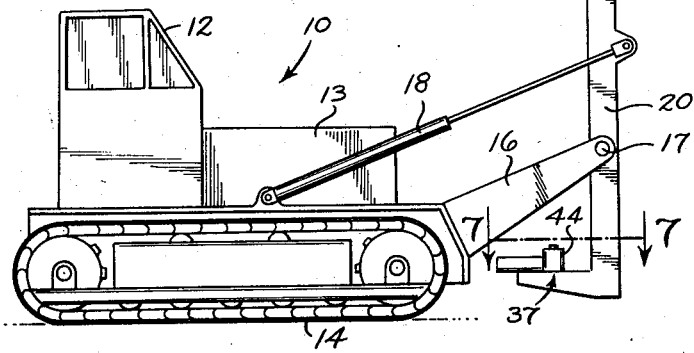
Fig. 1.
Melvin W. McCollum
INVENTOR.
BY Ramsey and Kolisch
Attys.

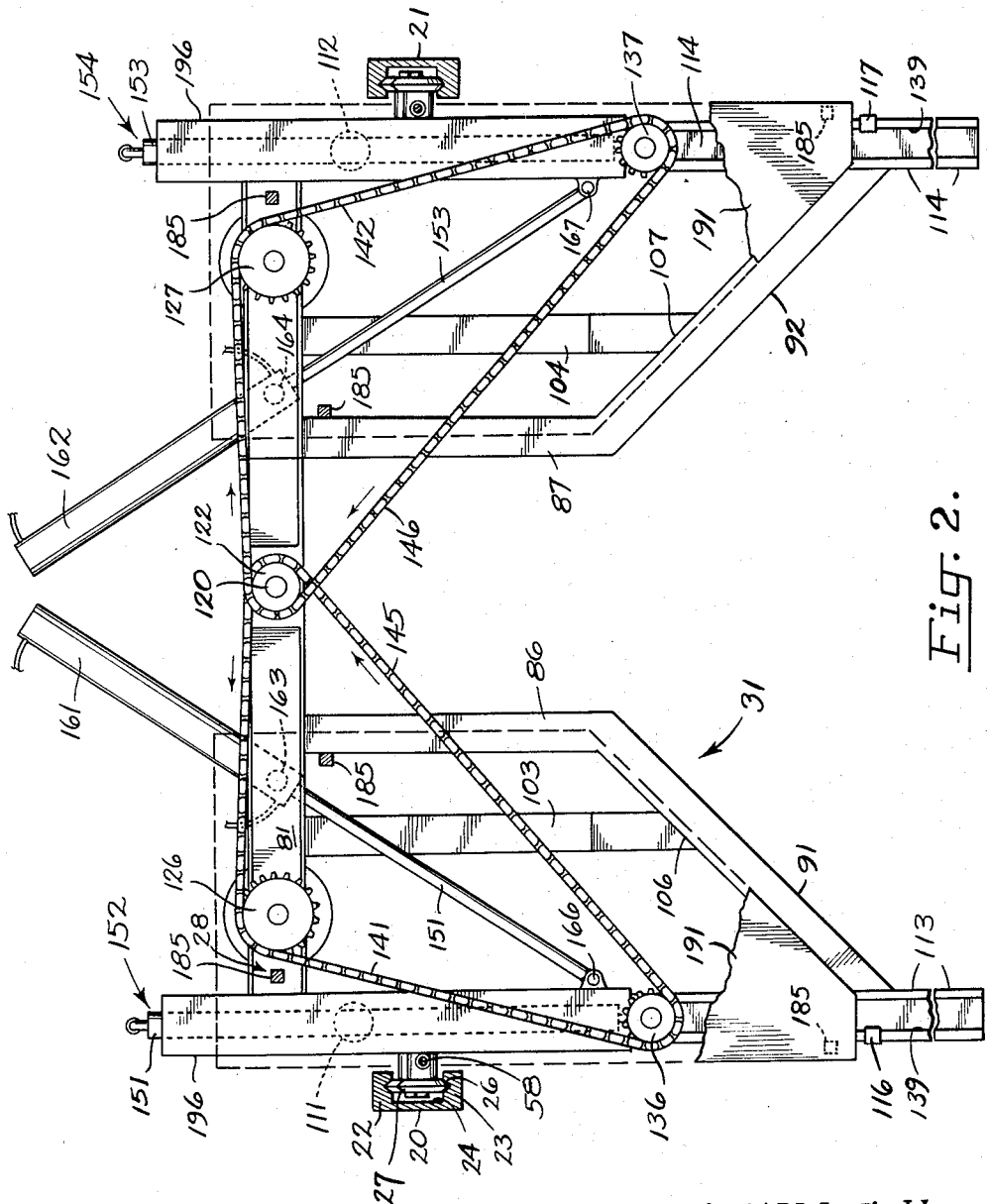

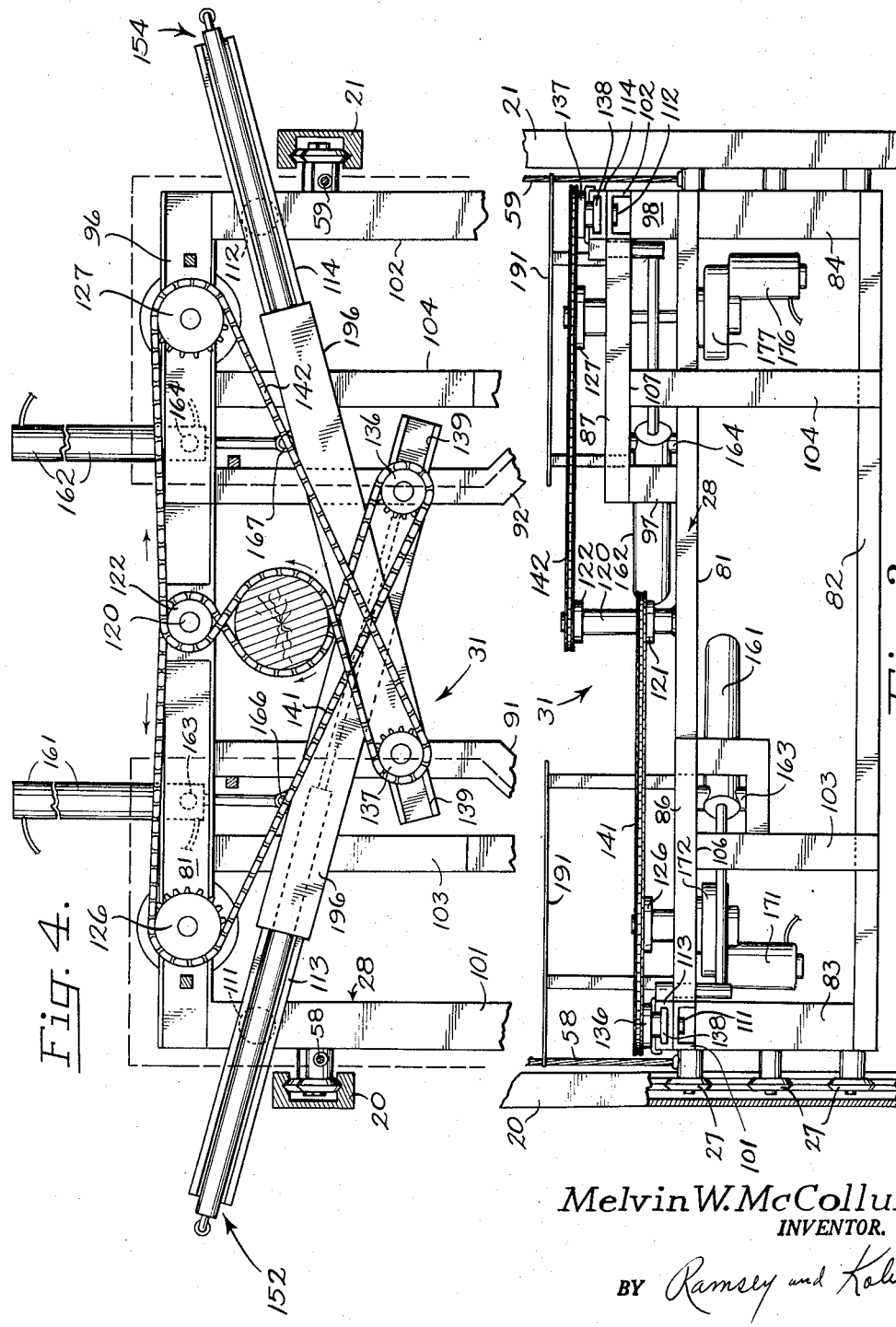

United States Patent Office 2,948,311
Patented Aug. 9, 1960

2,948,311

TREE HARVESTING APPARATUS

Melvin W. McCollum, P.O. Box 1049,
Klamath Falls, Oreg.

Filed Oct. 20, 1958, Ser. No. 768,357

4 Claims. (Cl. 143—32)

This invention relates to a tree harvesting apparatus, and more particularly to apparatus which may be used to remove outer peripheral growth from a tree to prepare the tree for processing into lumber or paper products.

Recently there has been a constant and increasing demand for logs from which to make lumber and other wood products such as paper, etc., and coupled with this demand for logs, a steady decrease in the supply of quality, standing tree growth from which such logs may be harvested. The demand coupled with the decreasing supply has made commercially valuable stands of young tree growth and stands of certain tree species, such as the lodgepole pine, which heretofore have had little use commercially. In the harvesting of such tree stands, labor costs have been relatively high in proportion to the amount of valuable wood obtainable, due to the relatively small size of the trees, their heavy branch growth, etc.

This invention contemplates improved harvesting apparatus which may be used to fell and to delimb a tree, which is characterized by a number of novel features contributing to its fast operation and utility. Specifically, the apparatus includes a novel delimbing unit, which is readily placed in operative position about the periphery of a standing tree, and which then may be shifted vertically upwardly along a tree trunk to remove branches from the tree prior to felling of the tree. The apparatus also comprises saw mechanisms for topping a tree and for cutting the tree at its base. Using the apparatus, a tree may be felled and completely delimbed in a minimal amount of time and with a substantial reduction in labor costs.

One of the objects of the invention is to provide a peripheral growth cutter for a tree which comprises a pair of endless chains equipped with cutting elements, and mechanism mounting the chains so arranged that the chains may be wrapped about a tree with the outer peripheries of the chains engaging the trunk of the tree and with the two chains in concert completely encircling the trunk. Mechanism is provided for rotating the chains, enabling the chains to cut the limbs from a tree as the unit is moved up along the tree trunk.

Specifically, the invention contemplates a cutting unit having a pair of chains which are mounted on the frame of the unit for movement in substantially parallel, horizontal planes. A run of one of the chains is set at an angle with respect to a run of the other of the chains, with one end of the run for the one chain overlapped with one end of the run for the other chain. The other ends of the chain runs are mounted on the frame in a spread apart position. Thus the two chain runs converge toward each other. Supporting these other ends of the chain runs is mechanism which accommodates swinging of the other ends of the chain runs toward and then across each other, with these other ends of the chain runs reaching an overlapped position. When the ends of the chain runs are so positioned, a tree trunk previously seated between the converging runs of the chains is completely and snugly surrounded by the two chains. When the chains are then rotated and the unit moved upwardly along a tree trunk, a delimbing operation takes place.

Thus, it is a more specific object of the invention to provide a cutting unit for removing limbs from trees which comprises a pair of chains mounted for movement in substantially parallel planes and arranged with a run of one of the chains overlapped at one end with a run of the other of the chains, and with the other ends of the two chain runs spread apart, and which also comprises mechanism for moving together the spread apart ends of the chain runs so that intermediate portions of the chain runs engage and completely encircle the trunk of a tree.

Another object is to provide, with such a construction, novel guide structure operable to funnel or guide a tree trunk centrally into the restricted area defined by the converging run of the chains, and then cradle the tree trunk, prior to movement of the spread apart ends across each other.

Still another object of the invention is to provide, with a unit of the type described, novel shielding structure for shielding the outer reaches of the two chains so that the chains on moving up the trunk of a tree having cutting elements which are exposed only in the vicinity of the tree trunk. The shielding structure also operates to bend the limbs upwardly thereby to permit easier cutting of the limbs.

Still another object of this invention is to provide such apparatus wherein the spread apart ends of the chain runs are mounted on sprockets or wheel mounts which are movable longitudinally along the nonpivoted ends of a pair of pivoted arms, and to provide biasing means for urging these wheel mounts to positions outwardly on the pivoted arms. The biasing means perform the double function of maintaining the chain runs tensioned about the trunk of the tree when they are swung about a tree, and most important, of extending the chain runs to their fullest extent around the periphery of the tree (the chain runs undergoing elongation), whereby complete and snug encircling of a tree is possible.

Still another object of the invention is to provide a mobile harvesting unit which comprises a vertically movable cutting unit for removing limbs from a standing tree wherein the cutting unit has a pair of cooperating chains of the type described, the combination accommodating easy mounting on a tree trunk prior to delimbing of the tree, and being characterized by long, trouble-free, and efficient operation.

These, and other objects and advantages are attained by the invention, which is described hereinbelow in conjunction with the accompanying drawings, wherein:

Fig. 1 illustrates, in small scale and in somewhat simplified form, tree harvesting apparatus constructed according to an embodiment of this invention, the apparatus comprising a mobile power and support unit, and support means supporting a vertically moving cutting unit;

Fig. 2 is an enlarged section view along the line 2—2 in Fig. 1, illustrating the cutting unit of the invention which is employed to cut the limbs from a tree;

Fig. 3 is an end elevation along the line 3—3 in Fig. 1 and with portions broken away, illustrating further details of the cutting unit;

Fig. 4 is a view similar to Fig. 2, save that the unit is shown in operative position with pivoted arms present in the unit swung inwardly about the trunk of a tree;

Fig. 5 is an enlarged view of a section of the cutting chain employed in the invention;

Fig. 6 is a top view of the cutting chain illustrated in Fig. 5; and

Figs. 7, 8, and 9 are views along the lines 7—7, 8—8, and 9—9, respectively, in Fig. 1.

Referring now to Fig. 1 wherein one embodiment of the invention is illustrated, the tree harvesting apparatus comprises a mobile land vehicle such as tractor 10, which has mounted at the forward end thereof an elongated vertical support structure, indicated generally at 11. Tractor 10 is conventional, and includes a cab 12, engine 13, and along opposite sides of the tractor crawler tracks, such as crawler track 14, which are used in propelling the tractor over the ground. Support structure 11 is supported on the forward end of the tractor by a yoke 16 secured at one end of the tractor and pivotally connected at 17 to the support structure. A pair of piston-cylinders 18 (one of which is obscured in Fig. 1) connected to the support structure and to the body of the tractor 10 are provided for swinging structure 11 about pivot 17 and thus adjusting the vertical position of the support structure. This enables the support structure to be placed more or less in parallel alignment with the trunk of a standing tree.

Referring now more particularly to Figs. 1, 2, and 3, support structure 11 comprises a pair of elongated, parallel rail members 20, 21, suitably braced at their top and bottom ends in spaced apart parallel relation. Each of the rail members as can best be seen in Fig. 2, is of channel-shaped cross-section, and thus has a pair of parallel, inwardly projecting flanges 22, 23 which are connected by an interconnecting web 24. Flanges 22, 23 are provided along this length with elongated grooves 26. Mounted for rolling movement in grooves 26 are a series of rollers 27 which are rotatably secured to a frame 28 of a cutting unit, indicated generally at 31.

Rail members 20, 21 support cutting unit 31 while accommodating vertical movement of the cutting unit up and down, such as occurs when the unit is used for cutting off the branches of a tree or dropped to the base of structure 11 to prepare the unit for cutting the branches from off another tree. While a particular construction has been described for mounting the cutting unit, it is obvious that another form of construction may be employed, as long as the construction permits up and down movement of the cutting unit along the length of a standing tree.

Mounted at the top and bottom of the support structure are a pair of saw mechanisms, indicated at 36, 37 respectively. The upper saw mechanism 36 is used for topping a tree and is adjustable vertically in support structure 11. The lower saw mechanism is similar in construction.

Considering saw mechanism 37, and referring to Figs. 1 and 7, the mechanism comprises a horizontally disposed saw blade 41, mounted for pivotal movement to and fro in a horizontal plane relative to support structure 11. Riding on the peripheral edge of the saw blade is a conventional saw chain 43. The saw chain is moved over the periphery of the saw blade by an electric motor 44. A piston-cylinder 46 connected to the saw blade is provided for moving the saw blade back and forth. Extension of piston-cylinder 46 operates to pivot the saw blade outwardly during a cutting pass, while contraction of the piston-cylinder returns the saw blade to a position out of the way of the trunk of a tree being harvested. Saw mechanism 37 is mounted directly on support structure 11, at a fixed elevation relative to the support structure.

Referring to Figs. 1 and 7, upper saw mechanism 36 is mounted on a movable platform 47 which has secured to opposite ends rollers 48 similar to rollers 27. Rollers 48 ride in grooves 26 of the guide structure, and guide platform 47 along rail members 20, 21 during vertical movement of the platform. Like the lower saw mechanism, upper saw mechanism 36 comprises a pivoted saw blade 49, a saw chain 50, a driving motor 51, and a piston-cylinder 52 for pivoting into an operative position saw blade 49.

Supported on the top of support structure 11 is a hoist mechanism, indicated generally at 53. Referring to Figs. 1 and 9, this comprises an electric motor 54, which is connected to pulleys 55, 56 of a winch 57. Wrapped over the pulleys of winch 57 are a pair of cables 58, 59, which have bottom end portions secured to the frame of the cutting unit (see Figs. 3 and 4). Cutting unit 31 is raised upwardly from the ground by energizing motor 54 so as to cause rotation of the winch pulleys and winding of the cables around the winch pulleys. A clutch-brake mechanism 61 of the winch is actuated to disconnect motor 54 from the winch pulleys, when it is desired to lower the cutting unit to the ground. When motor 54 is disconnected from the winch pulleys, unit 31 falls downwardly under the urging of gravity, and cables 58, 59 unwind from the winch pulleys.

Hoist mechanism 53 also comprises a second electric motor 62 which is connected through a clutch-brake 63 to pulley 64. Pulley 64 has wrapped therearound a cable 65 which has its bottom end connected to platform 47 supporting the upper saw mechanism. Motor 62 and pulley 64 is used in raising and lowering saw mechanism 36 prior to topping a tree.

Considering now more specifically the cutting unit, and referring more particularly to Figs. 2, 3, and 4, frame 28 of the unit comprises a pair of elongated parallel beam members 81, 82 set one above the other and interconnected at their ends, as by vertical brace portions 83, 84. Brace portions 83, 84 rotatably mount rollers 27 already described, and provide a rigid connection between beams 81, 82.

Projecting outwardly to one side of the frame are a pair of horizontally arranged, elongated guide bar members 86, 87. The inner ends of members 86, 87 are rigidly connected to and are integral with the frame, and the guide members constitute a rigid guide structure in the device. Guide members 86 and 87 have outer end portions 91, 92 which flare away from each other and thus define an open mouth for the guide structure.

The inner end of member 86 is secured directly to upper beam member 81, whereas the inner end of member 87 is carried by the frame a slight distance above member 86. Member 87 is secured to the main portion of the frame through a stub beam 96 mounted parallel to beam 81 but spaced thereabove by braces 97, 98.

Outer ends 91, 92 of the guide bar members are braced to the main portion of the frame by means of elongated rigid arms 101, 102, connected to beam member 81 and stub beam 96, respectively. Additional support is provided the guide bar members through bottom supports 103, 104, which are connected at their inner ends to lower beam member 82, project outwardly from this beam member, and then angle upwardly to a connection with the guide bar members at points 106, 107 (see Figs. 2 and 3). The construction is rigid and strong, and provides stable support for the cutter mechanism to be described.

Pivotably connected to rigid arms 101, 102 of the frame, by pivot connections 111, 112, are a pair of elongated pivot arms indicated at 113, 114 respectively. The pivot arms pivot from the position shown in Fig. 2, wherein the arms abut stops 116, 117 and are substantially parallel with each other and located squarely over rigid arms 101, 102, to the position shown in Fig. 4, wherein the outer, nonpivoted ends of the arms have crossed over and are overlapping each other. (The left arm in Figs. 3 and 4 swings under the right arm, with clearance provided under guide bar member 87, by reason of the raised position of pivot arm 114 and bar member 87.) Each of the pivot arms provides part of the support for a cutting chain.

More specifically, affixed to the main frame approximately centrally between pivot connections 111, 112 is a fixed sprocket shaft 120. Shaft 120 rotatably mounts a pair of vertically spaced sprockets 121, 122. These sprockets (or wheel mounts) rotate on shaft 120 about a common vertical axis.

Rotatably mounted on the main frame, one on each side of sprocket shaft 120, are a pair of sprockets or wheel mounts 126, 127. Sprocket 126 is positioned substantially in the horizontal plane of sprocket 121, whereas sprocket 127 occupies substantially the horizontal plane of sprocket 122.

A third pair of sprockets or wheel mounts 136, 137 are mounted on the free or nonpivoted ends of pivot arms 113, 114. Each of these sprockets is rotatably supported on a sliding shoe or mounting portion 138 (see Fig. 3). Shoes 138 are slidably mounted on arms 113, 114 for movement to and fro on the arms along the length of the arms. Thus, each of the arms is provided with an elongated runway 139 which slidably contains one of the sliding shoes.

Sprocket 136 supported by arm 113 occupies a common horizontal plane with sprockets 121, 126. Sprocket 137, on the other hand, occupies a common horizontal plan with sprockets 122, 127.

Trained over cooperating sprockets 121, 126, 136 is an elongated, continuous cutting chain or belt 141. In a similar manner, trained over cooperating sprockets 122, 127, and 137 is another elongated, continuous cutting chain or belt 142. The two cutting chains are supported by the various sprockets for travel in substantially parallel, horizontal planes. In the position of the parts shown in Figs. 2 and 3, it will be noted that chain 141 has a run or course 145 extending between sprockets 121, 136 which is disposed at an angle and converges with a run or course 146 of chain 142 extending between sprockets 122, 137. Further, it will be noted that the adjacent ends of the two belt runs overlap each other.

Disposed over and affixed to pivot arm 113 is a cylinder portion 151 of a piston-cylinder fluid motor 152. In a similar manner, disposed over and affixed to pivot arm 114 is a cylinder portion 153 of a piston-cylinder fluid motor 154. The rod portions of these piston-cylinders are secured to the sliding shoes mounting sprockets 136, 137. Elongation of the piston-cylinders produces movement of the sprockets outwardly on the pivot arms, whereas contraction of the piston-cylinders causes the sprockets to move in the opposite direction.

A second pair of piston-cylinders, indicated at 161, 162, are provided for swinging the pivot arms from the parallel position shown in Fig. 2, to the overlapped position of Fig. 4. The cylinder portions of these piston-cylinders are pivotally connected to beam member 81 as by pivot connections 163, 164. The rod ends of the piston-cylinders are pivotally connected at 166, 167 to the pivot arms, one to each pivot arm. While piston-cylinders 161, 162 function as positioning means for the pivot arms, piston-cylinders 152, 154 function as biasing means constantly urging the shoes supporting sprocket 136, 137 to an extended position on the pivot arms.

Electric motors are provided to move the cutting chains over their respective sprockets. Thus, as best seen in Fig. 3, electric motor 171 is connected to sprocket 126 by power transmitting means or gear box 172. Similarly, electric motor 176 is connected by power transmitting means or gear box 177 to sprocket 127. In practice, when these motors are energized, they operate to rotate the chains in opposite directions, with the chains traveling in the direction of the arrows in Figs. 2 and 4. Control means is provided (not shown) whereby the running of the motors may be controlled from the cab of the vehicle or tractor.

Referring now to Figs. 5 and 6, chains 141, 142, which are similar, each are equipped with cutting elements, indicated at 181, 182, which project outwardly from the chain in a direction parallel to the rotation axes of the rollers for the chain. When mounted on the cutter unit, these cutting elements project upwardly from the chains, viewing the unit as in Figs. 2 and 4. The cutting elements act to cut away branches and other growth on the periphery of a tree, whereas the rollers and body of the chain slide over and engage the periphery of a tree without appreciable cutting action.

Secured to the frame on mounting brackets 185, and elevated above the cutting chains, are a pair of deflector shield plates 191 (see Fig. 2). These are shown removed from the unit in Figs. 3 and 4, for reasons of clarity. The deflector shields have inner outlines which conform substantially to the outlines of the guide bar members 86, 87. They extend outwardly over the cutter unit substantially coextensively with rigid support arms 101, 102. The plates act to bend the outer ends of limbs contracted by the plates upwardly, and to tension portions of the limbs adjacent the trunk of a tree so as to prepare these portions for cutting. They also shield outer portions of the chains spaced away from sprockets 121, 122 and prevent encumbrance of these portions of the chains.

Shields 196 may also be provided on pivot arms 113 and 114 for deflecting material away from runways 139. These are shown secured to the sliding shoes mounting sprockets 136, 137, and are thus movable conjointly with the shoes.

In operation of the device, the cutting unit is moved against the lower portion of the periphery of a standing tree trunk, with the pivot arms outstretched in the position of Fig. 2. In this condition of the parts, the inner ends of chain runs 145, 146 are overlapped and the outer ends are spread apart. The inner end portions of guide bars 86, 87, which define a trunk-receiving seat, cradle the tree trunk in a position adjacent the overlapped ends of the chain runs.

After a tree trunk is properly positioned, pivot arms 113, 114 are swung inwardly about their pivot connections by contraction of piston-cylinders 161, 162. The nonpivoted or free ends of the pivot arm swing toward and then across each other, with the outer, spread apart ends of the chain runs moving to an overlapped position. This condition of the parts is shown in Fig. 4. As a result, intermediate portions of the chain runs engage the tree trunk and snugly encompass the tree trunk. During pivotal movement of arms 113, 114, piston-cylinders 152, 154 urge sprockets 136, 137 outwardly on the pivot arms.

The cutting unit is then moved vertically upwardly along the tree trunk by operation of hoist mechanism 53. As the cutting unit moves upwardly, the cutting elements of the chains cut across any limbs encountered and sever the limbs. Cutting occurs after the limbs are initially bent and stressed by the shield plates 191.

When the top of the tree is reached, the tree is topped by actuating saw mechanism 36 at the top of the support structure, the base of the tree may then be severed by actuating saw mechanism 37. The product is a felled tree which has been completely delimbed prior to felling.

The cutting unit itself is characterized by a number of desirable features. A tree is readily advanced into the unit by pushing the unit forwardly against the base of a tree with the guide bars funneling the trunk into proper position and then cradling the tree. The chains themselves also function to direct the tree trunk centrally between the pivot arms. Once properly positioned the entire perimeter of a tree is surrounded by chain. The construction contemplated permits the handling of a wide variety of tree trunk sizes. Practically speaking, the only thing limiting the smallness of the diameter of a tree that may be handled is the lack of strength of small diameter tree trunks, which enables them to give from an upright position between the cutting chains. Large as well as small diameter trees are handled with equal facility.

The apparatus contemplated permits economical harvesting of trees which heretofore presented numerous problems to lumbermen. The apparatus is relatively simple to manufacture, and free of complex parts, and thus is ideally suited for operation in the woods.

While there has been described an embodiment of the invention, it is appreciated that changes may be made in the various parts and their organization without departing from the invention. It is desired, therefore, not to be limited to the specific embodiment shown, but to cover all modifications and variations which would be apparent to those skilled in the art and that come within the scope of the appended claims.

It is claimed and desired to secure by Letters Patent:

1. Apparatus for trimming growth from the trunk of a standing tree comprising a vertically and horizontally movable frame, a pair of laterally spaced, elongated, horizontal guides fixed to the frame in oppositely disposed relation and joined at one set of ends thus to define a U-shaped cradle structure for cradling three sides of a tree trunk, the other set of ends of said guides being open and defining an open mouth for the cradle structure, a pair of elongated arms and pivot connections spaced laterally outwardly of said guides adjacent their joined ends pivotally mounting one set of ends of the arms on the frame, with one arm on one side and one arm on the other side of the cradle structure, said pivot connections accommodating pivotal movement of the arms about vertical axes from a position on either side of the cradle structure to a position where the nonpivoted ends of the arms swing across each other and the arms close off the open mouth of the cradle structure, a pair of power-driven, continuous cutting belts occupying substantially horizontal planes and having an inner set of runs disposed substantially oppositely each other, and means mounting the cutting belts on said frame with said inner runs in spread-apart position and with one substantially on one side and one substantially on the other side of said cradle structure whereby the mouth of said cradle structure is left open, the mounting for the belts including sprockets mounted on the nonpivoted ends of the arms, one for each belt, training one set of ends of the inner runs of the belts and positioned to swing across one another on movement of the arms whereby movement of the arms to a position closing off the cradle structure is accompanied by movement of the ends of the inner runs of the belts to a position where the belts cross each other.

2. Apparatus for trimming growth from the trunk of a standing tree comprising a vertically and horizontally movable frame, a pair of laterally spaced, elongated, horizontal guides fixed to the frame in oppositely disposed relation and joined at one set of ends thus to define a U-shaped cradle structure for cradling three sides of a tree trunk, the other set of ends of said guides being open and defining an open mouth for the cradle structure, a pair of elongated arms and pivot connections spaced laterally outwardly of said guides adjacent their joined ends pivotally mounting one set of ends of the arms on the frame, with one arm on one side and one arm on the other side of the cradle structure, said pivot connections accommodating pivotal movement of the arms about vertical axes from a position on either side of the cradle structure to a position where the nonpivoted ends of the arms swing across each other and the arms close off the open mouth of the cradle structure, a pair of power-driven, continuous cutting belts occupying substantially horizontal planes, and means mounting the belts on the frame, said means including for each belt one sprocket mounted on the frame intermediate the joined ends of the guides and another sprocket mounted on the nonpivoted end of one of the arms, said sprockets training the belts whereby the latter extend in elongated reaches between the sprockets, said arms being pivotable to a position where they overlap and close off the mouth of the cradle structure, said sprockets on the nonpivoted ends of the arms in the latter position training the belts so that they cross each other.

3. The device of claim 2 wherein the sprockets on the nonpivoted ends of the arms are shiftable along the length of the arms, and which further comprises a fluid motor means connected to each sprocket on the nonpivoted ends of the arms operable to urge the sprocket outwardly on its arm away from the pivot connection for the arm.

4. Apparatus for trimming growth from the trunk of a standing tree comprising a vertically and horizontally movable frame, a pair of laterally spaced, elongated, horizontal guides fixed to the frame in oppositely disposed relation and joined at one set of ends thus to define a U-shaped cradle structure for cradling three sides of a tree trunk, a pair of elongated arms mounted on said frame, one spaced laterally to one side and one spaced laterally to the other side of said cradle structure, pivot connection spaced laterally outwardly of said guides and adjacent their joined ends pivotally mounting one set of ends of the arms on the frame, said pivot connections accommodating swinging of the nonpivoted ends of the arms about vertical axes from a substantially parallel position to a position wherein the nonpivoted ends cross each other and the mouth of the cradle structure is closed off by the arms, a pair of power-driven, continuous cutting belts occupying substantially horizontal planes and having an inner set of runs disposed substantially oppositely each other, a sprocket for each belt training one end of the belt at a point spaced intermediate the guides and adjacent where the guides are joined and another sprocket for each belt adjacent the nonpivoted end of an arm training another end of the belt, said inner runs of the belts diverging outwardly from each other progressing toward the nonpivoted ends of the arms with the arms in their parallel position, and shield portions on either side of said cradle structure disposed above the belts and extending outwardly from the cradle structure for shielding portions of the belts disposed laterally outwardly of the cradle structure.

References Cited in the file of this patent

UNITED STATES PATENTS

| | | |
|---|---|---|
| 707,428 | Kidder | Aug. 19, 1902 |
| 1,937,073 | Stuve | Nov. 28, 1933 |
| 2,707,007 | Shuff | Apr. 26, 1955 |
| 2,760,534 | Hansel | Aug. 28, 1956 |
| 2,871,620 | Bothe | Feb. 3, 1959 |
| 2,882,941 | Pope | Apr. 21, 1959 |